United States Patent
Aoki et al.

(10) Patent No.: US 12,275,414 B2
(45) Date of Patent: Apr. 15, 2025

(54) DYNAMIC AND SELECTIVE PAIRING BETWEEN PROXIMATE VEHICLES

(71) Applicant: AyDeeKay LLC, Aliso Viejo, CA (US)

(72) Inventors: Ichiro Aoki, Aliso Viejo, CA (US); Shmuel Silverman, Novato, CA (US); Steven Elliot Stupp, Foster City, CA (US)

(73) Assignee: AyDeeKay LLC, Aliso Viejo, CA (US)

( * ) Notice: Subject to any disclaimer, the term of this patent is extended or adjusted under 35 U.S.C. 154(b) by 267 days.

(21) Appl. No.: 17/712,053

(22) Filed: Apr. 1, 2022

(65) Prior Publication Data

US 2023/0095194 A1 Mar. 30, 2023

Related U.S. Application Data

(60) Provisional application No. 63/250,578, filed on Sep. 30, 2021.

(51) Int. Cl.
*B60W 40/105* (2012.01)
*H04W 4/02* (2018.01)
(Continued)

(52) U.S. Cl.
CPC .......... *B60W 40/105* (2013.01); *H04W 4/025* (2013.01); *H04W 4/46* (2018.02);
(Continued)

(58) Field of Classification Search
CPC ....... H04W 4/025; H04W 4/46; H04W 12/50; B60W 40/105; B60W 2420/408;
(Continued)

(56) References Cited

U.S. PATENT DOCUMENTS

| 9,922,565 B2 | 3/2018 | Thomas et al. |
| 10,252,717 B2 | 4/2019 | Avedisov et al. |

(Continued)

FOREIGN PATENT DOCUMENTS

| CN | 108320554 A | 7/2018 |
| WO | 2020121300 A1 | 6/2020 |
| WO | 2020259636 A1 | 12/2020 |

OTHER PUBLICATIONS

PCT Patent Appl. Serial No. PCT/US22/044638, International Search Report and Written Opinion, Jan. 10, 2023.

*Primary Examiner* — John M Zaleskas
(74) *Attorney, Agent, or Firm* — Steven Stupp

(57) ABSTRACT

An integrated circuit for use in a first vehicle may include: an interface circuit that communicates with a second integrated circuit in a second vehicle; and a processing circuit. During operation, the processing circuit may determine that the second vehicle has better situational awareness for a portion of a road or an environment proximate to the road than the first vehicle, where the second vehicle is proximate to the first vehicle. Then, the processing circuit may dynamically establish, with the second integrated circuit, a communication pairing with the second vehicle. Moreover, the integrated circuit may exchange, via the pairing, information with the second integrated circuit. For example, the exchanged information may include or may specify: measurement data, one or more detected objects, one or more object identifiers, seed information for a detection technique (such as a priori information), and/or a priority or urgency of the exchanged information.

20 Claims, 5 Drawing Sheets

(51) Int. Cl.
  *H04W 4/46* (2018.01)
  *H04W 12/50* (2021.01)
(52) U.S. Cl.
  CPC ........ *H04W 12/50* (2021.01); *B60W 2552/20* (2020.02); *B60W 2554/4049* (2020.02)
(58) Field of Classification Search
  CPC ...... B60W 2552/20; B60W 2554/4049; G08G 1/161–163; G08G 1/166; G08G 1/096791
  See application file for complete search history.

(56) References Cited

U.S. PATENT DOCUMENTS

| | | | |
|---|---|---|---|
| 2002/0198660 A1* | 12/2002 | Lutter | G08G 1/0965 342/455 |
| 2007/0030212 A1* | 2/2007 | Shibata | G06T 5/50 345/9 |
| 2007/0046459 A1* | 3/2007 | Silverman | G06Q 10/08 340/539.13 |
| 2007/0106431 A1* | 5/2007 | Tsuzuki | G08G 1/161 701/1 |
| 2014/0012492 A1* | 1/2014 | Bowers | G08G 1/16 701/301 |
| 2014/0350792 A1* | 11/2014 | Schrabler | G01S 13/003 342/450 |
| 2015/0039218 A1* | 2/2015 | Bowers | B60W 30/08 701/301 |
| 2015/0241880 A1* | 8/2015 | Kim | G05D 1/0055 701/25 |
| 2016/0117927 A1* | 4/2016 | Stefan | G08G 1/143 340/932.2 |
| 2016/0277601 A1* | 9/2016 | Seymour | G08G 1/04 |
| 2016/0302046 A1* | 10/2016 | Velusamy | G08G 1/0133 |
| 2017/0025017 A1* | 1/2017 | Thomas | B60W 10/20 |
| 2017/0178498 A1* | 6/2017 | Mcerlean | G08G 1/166 |
| 2017/0263125 A1* | 9/2017 | Tanabe | G08G 1/164 |
| 2017/0274821 A1* | 9/2017 | Goudy | G01S 5/0072 |
| 2017/0287338 A1* | 10/2017 | Neubecker | H04W 4/46 |
| 2017/0352200 A1* | 12/2017 | Wang | H04W 4/027 |
| 2018/0101736 A1* | 4/2018 | Han | G02B 27/01 |
| 2018/0194352 A1* | 7/2018 | Avedisov | G08G 1/163 |
| 2018/0218607 A1* | 8/2018 | Baghel | G08G 1/161 |
| 2018/0232961 A1* | 8/2018 | Wang | H04W 4/023 |
| 2018/0261095 A1* | 9/2018 | Qiu | G01S 17/86 |
| 2019/0049992 A1* | 2/2019 | Riess | G05D 1/0276 |
| 2019/0080614 A1* | 3/2019 | Lee | G08G 1/0112 |
| 2019/0143967 A1* | 5/2019 | Kutila | B60W 30/09 701/23 |
| 2019/0176823 A1* | 6/2019 | Avedisov | G08G 1/166 |
| 2019/0213884 A1* | 7/2019 | Kim | G01S 17/931 |
| 2019/0238658 A1* | 8/2019 | Shimizu | H04W 4/46 |
| 2019/0256091 A1* | 8/2019 | Lepp | G08G 1/143 |
| 2019/0311614 A1* | 10/2019 | Yang | G08G 1/052 |
| 2019/0325751 A1* | 10/2019 | Altintas | G05D 1/0077 |
| 2019/0362631 A1* | 11/2019 | Baghel | H04W 88/04 |
| 2019/0375422 A1* | 12/2019 | Shtrom | G01S 13/931 |
| 2020/0068044 A1* | 2/2020 | Shimizu | H04W 4/46 |
| 2020/0074861 A1* | 3/2020 | Park | G08G 1/166 |
| 2020/0090521 A1* | 3/2020 | Kim | G08G 1/163 |
| 2020/0100189 A1* | 3/2020 | Liu | H04W 52/327 |
| 2020/0103900 A1 | 4/2020 | Cella | |
| 2020/0137580 A1* | 4/2020 | Yang | H04W 4/46 |
| 2020/0183002 A1* | 6/2020 | Lee | G01S 13/86 |
| 2020/0269866 A1* | 8/2020 | Choi | B60R 16/03 |
| 2020/0276988 A1* | 9/2020 | Graves | G06N 3/08 |
| 2020/0331465 A1* | 10/2020 | Herman | G08G 1/161 |
| 2021/0049902 A1* | 2/2021 | Zhang | G05D 1/0291 |
| 2021/0049903 A1* | 2/2021 | Zhang | G08G 1/0112 |
| 2021/0155245 A1* | 5/2021 | Naserian | H04W 4/46 |
| 2021/0157332 A1* | 5/2021 | Cox | G05D 1/0291 |
| 2021/0272462 A1* | 9/2021 | Yang | G08G 1/163 |
| 2021/0311181 A1* | 10/2021 | Chae | G01S 13/931 |
| 2021/0362733 A1* | 11/2021 | Yoon | G08G 1/096758 |
| 2022/0005354 A1* | 1/2022 | Baghel | H04W 4/38 |
| 2022/0116162 A1* | 4/2022 | Song | G01S 5/0284 |
| 2022/0176976 A1* | 6/2022 | Fermon | G01S 17/931 |
| 2022/0406174 A1* | 12/2022 | Hsu | H04L 67/12 |
| 2023/0042133 A1* | 2/2023 | Cox | H04W 4/44 |

\* cited by examiner

DYNAMIC AND SELECTIVE PAIRING BETWEEN PROXIMATE VEHICLES

CROSS REFERENCE TO RELATED APPLICATIONS

This application claims priority under 35 U.S.C. 119(e) to U.S. Provisional Application Ser. No. 63/250,578, entitled "Dynamic and Selective Pairing Between Proximate Vehicles," by Ichiro Aoki et al., filed on Sep. 30, 2021, the contents of both of which are herein incorporated by reference.

FIELD

The present disclosure relates to techniques for performing joint measurements using proximate vehicles that are dynamically and selectively paired.

BACKGROUND

Many vehicles are being equipped with forward-obstacle-seeking systems that include sensors, such as cameras, LiDARs and radar. However, in traffic, if a car or a truck immediately in front of a vehicle obstructs the field of view of a sensor, it is difficult to determined conditions in front of this car or truck, such as whether there is another vehicle in front of the car or truck. Moreover, if there is the other vehicle undetected in front of the car of truck suddenly brakes, the vehicle may not have enough time and/or may not have kept sufficient spacing in order to prevent the vehicle from crashing into the car or truck. Thus, because of the obstruction by the car or truck, a forward-obstacle-seeking system may not be able to predict and/or avoid a collision. Indeed, the forward-obstacle-seeking system may not even know the other vehicle exists.

SUMMARY

Embodiments of an integrated circuit for use in a first vehicle are described. This integrated circuit includes: an interface circuit that communicates with a second integrated circuit in a second vehicle; and a processing circuit. During operation, the processing circuit determines that the second vehicle has better situational awareness for a portion of a road or an environment proximate to the road than the first vehicle, where the second vehicle is proximate to the first vehicle. Then, the processing circuit dynamically establishes, with the second integrated circuit, a communication pairing with the second vehicle.

Note that the integrated circuit may perform measurements in the environment. For example, the measurements may include radar and/or lidar. Alternatively or additionally, the measurements may include another type of measurement, such as visual imaging using a camera.

Moreover, the processing circuit may synchronize, via the pairing, a clock in the first vehicle with a second clock in the second vehicle.

Furthermore, the integrated circuit may coordinate, via the pairing, the measurements with second measurements performed by the second integrated circuit. For example, the coordination may include alternating or concurrent transmission of measurement signals by the integrated circuit and the second integrated circuit.

Additionally, the integrated circuit may concurrently perform measurements jointly with the second integrated circuit.

In some embodiments, the integrated circuit may jointly analyze measurements associated with the first vehicle and/or second measurements associated with the second vehicle.

Note that the integrated circuit may exchange, via the pairing, information with the second integrated circuit. For example, the exchanged information may include or may specify: measurement data, one or more detected objects, one or more object identifiers, seed information for a detection technique, and/or a priority or urgency of the exchanged information. Moreover, the seed information may include a priori information. Furthermore, the integrated circuit may include a detection channel to analyze measurements associated with the first vehicle and may include a second detection channel to analyze measurements associated with the second vehicle. Alternatively or additionally, the integrated circuit may include a detection channel to analyze measurements associated with the first vehicle in first time intervals and second measurements associated with the second vehicle in second time intervals.

In some embodiments, the integrated circuit may: generate synthetic measurement data based at least in part on the exchanged information; and analyze measurement data associated with the first vehicle and the synthetic measurement data to detect an object in the environment and/or to identify the object in the environment. Note that the synthetic measurement data may be generated using a pre-trained neural network.

Moreover, the integrated circuit may perform measurements in the environment and communication, via the pairing, may occur in a band of frequencies associated with the measurements. Alternatively or additionally, the integrated circuit may perform measurements in the environment and communication, via the pairing, may occur outside of a band of frequencies associated with the measurements.

Furthermore, a number of possible pairings with the integrated circuit may be based at least in part on a predefined distance corresponding to a speed of the first vehicle. For example, a number of possible pairings between the integrated circuit and one or more second integrated circuits in one or more second vehicles may be reduced as the speed of the first vehicle or the corresponding predefined distance decreases.

Another embodiment provides a vehicle that includes the integrated circuit.

Another embodiment provides a system that includes the integrated circuit.

Another embodiment provides a method for dynamically establishing a communication paring. This method includes at least some of the operations performed by the integrated circuit.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
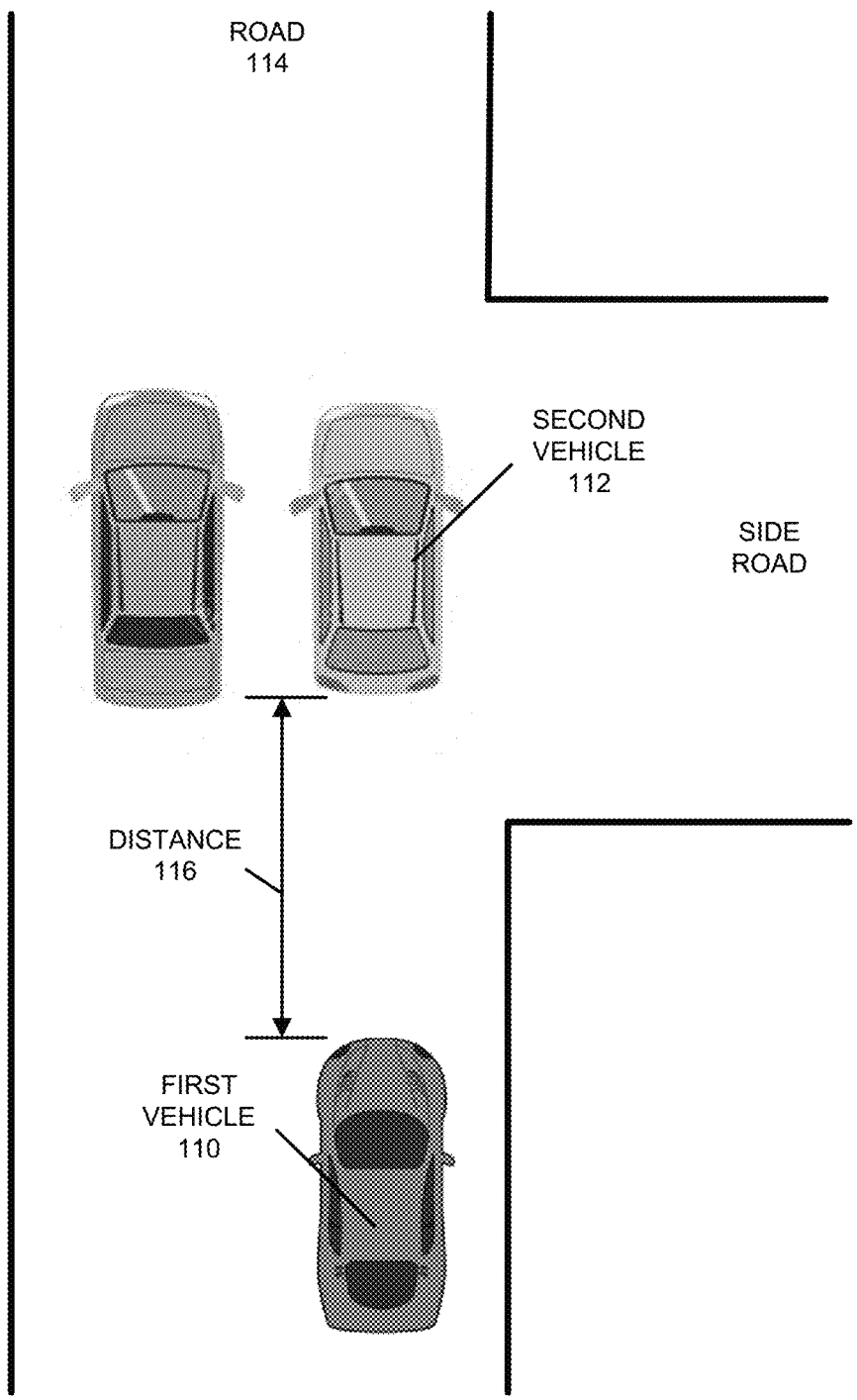
FIG. 1 is a drawing illustrating an example of an environment proximate to a vehicle according to some embodiments of the present disclosure.

An integrated circuit for use in a first vehicle is described. This integrated circuit may include: an interface circuit that communicates with a second integrated circuit in a second vehicle; and a processing circuit. During operation, the processing circuit may determine that the second vehicle has better situational awareness for a portion of a road or an environment proximate to the road than the first vehicle, where the second vehicle is proximate to the first vehicle. Then, the processing circuit may dynamically establish, with the second integrated circuit, a communication pairing with the second vehicle. Moreover, the integrated circuit may exchange, via the pairing, information with the second integrated circuit. For example, the exchanged information may include or may specify: measurement data, one or more detected objects, one or more object identifiers, seed information for a detection technique (such as a priori information), and/or a priority or urgency of the exchanged information. Furthermore, the integrated circuit may analyze measurements associated with the first vehicle and/or second measurements associated with the second vehicle.

By dynamically establishing the communication pairing, these circuit techniques may improve the situational awareness for the portion of the road or the environment proximate to the road. For example, the circuit techniques may allow the integrated circuit to obtain information from the second integrated circuit, such as information about another vehicle, in, e.g., a blind spot of the first vehicle. More generally, the circuit techniques may allow the integrated circuit to coordinate and exchange information with the second integrated circuit so that the integrated circuit can improve detection and/or identification of objects in the environment. Consequently, the circuit techniques may make sensing performed by the integrated circuit more robust and reliable, and thus may facilitate the use of the integrated circuit in a wide variety of systems, electronic devices and applications, such as assisted or automated (or self-) driving of the first vehicle.

We now describe embodiments of the circuit techniques. The circuit techniques may facilitate dynamic and selective pairing of proximate vehicles. In the circuit techniques, a first vehicle may initiate pairing with a second vehicle (or at least an instance of an integrated circuit in the first vehicle may pair with an instance of the integrated circuit in the second vehicle, which are, respectively, referred to as a first integrated circuit and a second integrated circuit). For example, the pairing may be based at least in part on improved situational awareness of the second vehicle (such as effectively extending the measurement range of the first vehicle or reducing or eliminating blind spots of the first vehicle, notably blind spots associated with shadowing by one or more vehicles or physical objects). During the pairing, the first vehicle and the second vehicle may synchronize clocks. This may allow the first vehicle and the second vehicle to coordinate their measurements to provide an effectively larger baseline and/or a synthetic aperture, and/or to alternate transmissions based at least in part on a duty cycle to reduce or eliminate mutual interference between the first vehicle and the second vehicle. Note that the duty cycle may be 50% or, more generally, may be weighted according to the relative ability of the first vehicle and the second vehicle to acquire measurements about a particular portion of the environment proximate to the first vehicle. After pairing, the first vehicle and the second vehicle may exchange information (using in-band and/or out-of-band communication) to facilitate improved detection. Notably, the exchanged information may include or may specify: raw measurement data, one or more detected objects, one or more object identifiers, seed information for a detection technique (such as a priori information), and/or a priority or urgency of the exchanged information. In some embodiments, the first vehicle may generate synthetic measurement data based at least in part on the exchanged information, and the synthetic measurement data may be used in the detection technique.

Figure 2:
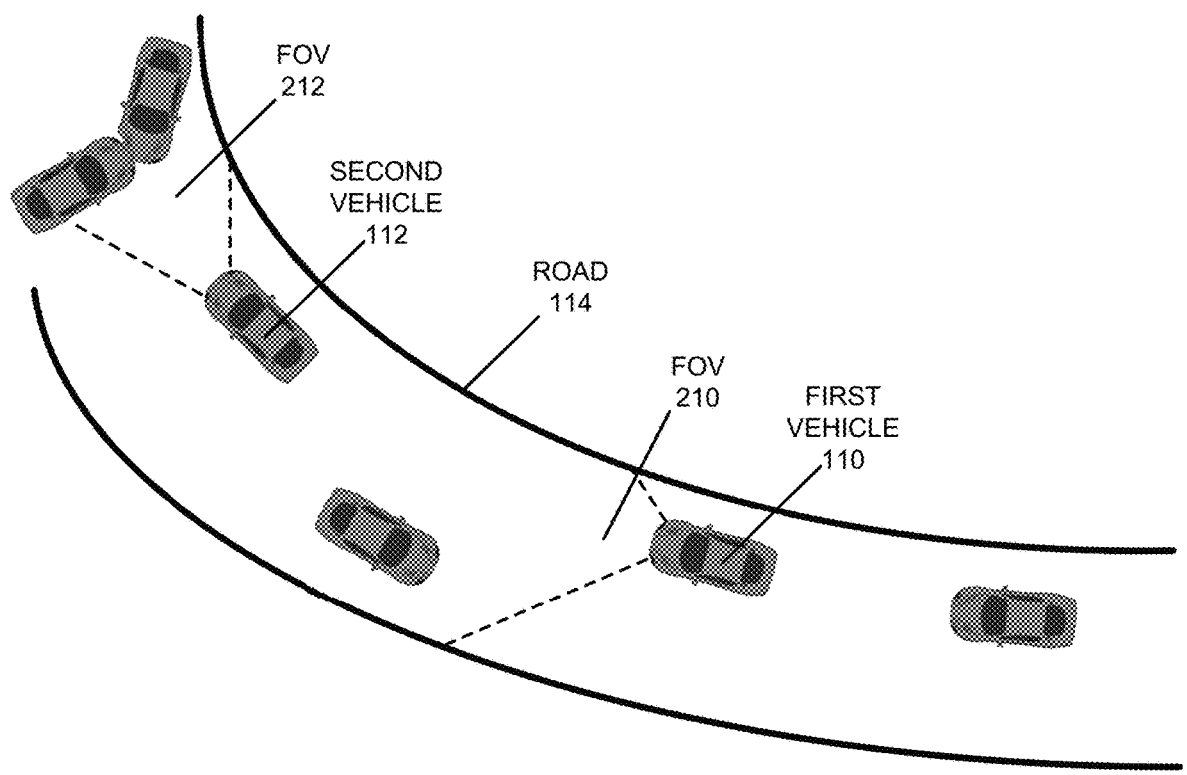
FIG. 2 is a drawing illustrating an example of an environment proximate to a vehicle according to some embodiments of the present disclosure.

For example, as shown in FIG. 1, which presents a drawing illustrating an example of an environment proximate to a first vehicle 110. Notably, the first vehicle 110 (such as a first car or truck) may determine that a second proximate vehicle 112 (such as a second car or truck) on a road 114 may have improved situational awareness than the first vehicle 110. Notably, the second vehicle 112 may, at least in part, be in front or behind the first vehicle 110 and, thus, may be able to perform measurements (such as radar, imaging and/or lidar) of portions of road 114 that are further away from the first vehicle 110 (thereby effectively extending the range of measurements available to the first vehicle 110) and/or may have an improved field of view (FOV) 212 than a field of view 210 of the first vehicle 110. This is illustrated in FIG. 2, which presents a drawing illustrating an example of an environment proximate to the first vehicle 110. Alternatively or additionally, the second vehicle 112 may perform measurements in a region (such as a side street or a portion of an adjacent lane) that the first vehicle 110 is unable to 'see' because of masking or shadowing effects associated with one or more vehicles on road 114 or nearby physical objects (such as buildings). Thus, the circuit techniques may reduce or eliminate blind spots for the first vehicle 110, thereby allowing the first vehicle 110 to effectively 'see' around a corner or through the second vehicle 112. This is illustrated in FIG. 3, which presents a drawing illustrating an example of an environment proximate to the first vehicle 110.

Figure 3:
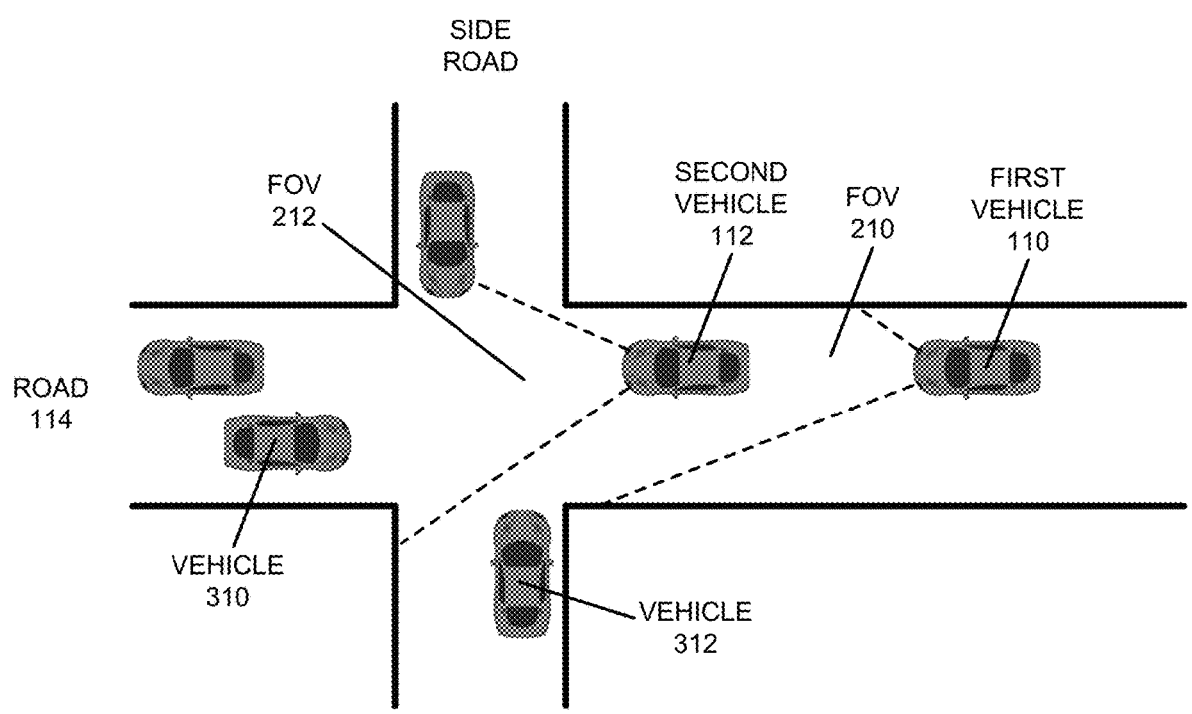
FIG. 3 is a drawing illustrating an example of an environment proximate to a vehicle according to some embodiments of the present disclosure.

While the field of views in FIGS. 2 and 3 are illustrated for a forward-obstacle-seeking system, in some embodiments the field of view of a given vehicle may be forward-facing, side-facing and/or rear-facing. Thus, a dynamic communication pairing may be established when a rear-facing and/or side-facing field of view of one or more sensors in the second vehicle 112 provides improved situational awareness of road 116 or a portion of an environment proximate to the first vehicle 110. Moreover, while the dynamic communication pairing in FIGS. 1-3 is with the second vehicle 112 traveling in the same direction as the first vehicle 110, in other embodiments the second vehicle 112 may be traveling in a different direction, such as the opposite direction or at a right angle to the direction of motion of the first vehicle 110, such as vehicle 310 or vehicle 312. Furthermore, while the dynamic communication pairing has been illustrated with the second vehicle 112, in other embodiments of the circuit techniques dynamic communication pairing for improved situational awareness may be established with a stationary sensor (such as a traffic camera), a sensor on a bicycle or a scooter (and, more generally, on a different class of conveyance than the first vehicle 110), a sensor in an aircraft (such as a helicopter), a sensor in a drone, and/or a sensor on a pedestrian (such as a camera view of a cellular telephone of the pedestrian).

Note that the first vehicle 110 may be paired with zero or more vehicles at a given time and that a given pairing may be created or discontinued at will by an integrated circuit in the first vehicle 110. Thus, as vehicles move relative to each other or enter or exit road 114, pairings may be created or discontinued. In some embodiments, a given pairing is created based at least in part on communication performance between the first vehicle 110 and the second vehicle 112. For example, the communication performance may include: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). Alternatively or additionally, the pairing may be based at least in part on a predefined distance between the first vehicle 110 and the second vehicle 112, so that pairing may occur when a distance 116 between the first vehicle 110 and the second vehicle 112 is less than 50, 100 or 250 ft. In some embodiments, the predefined distance is a function of the speed of the first vehicle 110 and/or the second vehicle 112. Thus, the predefined distance may be larger at higher speeds (such as on a highway) than at lower speeds (such as on a local street or when the first vehicle 110 and the second vehicle 112 are in congested traffic). Moreover, in some embodiments, the predefined distance may be based at least in part on a number of vehicles that a given vehicle is paired with and/or communication performance of the communication with one or more vehicles that the given vehicle is paired with (such as an available capacity or a throughput of the communication).

After the determination, the first vehicle 110 may pair with the second vehicle 112. In some embodiments, during the pairing, the first vehicle 110 may synchronize at least one of its clocks with at least one clock in the second vehicle 112. This may allow the first vehicle 110 and the second vehicle 112 to coordinate their measurements. For example, the first vehicle 110 and the second vehicle 112 may alternate transmissions, such as based at least in part on a duty cycle, such as by alternating measurement transmissions during alternating time intervals. Note that the duty cycle may be 50/50 or may not be balanced. Thus, in some embodiments, the communication may use time domain multiple access (TDMA). The use of alternating transmissions during the measurements may reduce or eliminate mutual interference between the first vehicle 110 and the second vehicle 112 during the measurements. However, in other embodiments, the transmissions by the first vehicle 110 and the second vehicle 112 may use frequency domain multiple access (FDMA) or orthogonal frequency domain multiple access (OFDMA). Consequently, in some embodiments, the first vehicle 110 and the second vehicle 112 may concurrently transmit during measurements. Note that in some embodiments the first vehicle 110 and the second vehicle 112 may jointly perform measurements, e.g., of signals transmitted by the first vehicle 110 and/or the second vehicle 112. Therefore, in these embodiments, the paired first vehicle 110 and second vehicle 112 may effectively have a larger baseline and/or a synthetic aperture, which may improve the resolution of the measurements.

Moreover, after pairing, the first vehicle 110 and the second vehicle 112 may exchange information to facilitate improved detection. For example, at least some of the exchanged information may be transmitted from the first vehicle 110 to the second vehicle 112 (and/or vice versa) using communication in the same band of frequencies as the measurements (such as sideband communication and, more generally, in-band communication). Alternatively or additionally, the communication between the first vehicle 110 and the second vehicle 112 may use a separate channel or band of frequencies than the measurements (or out-of-band communication). Note that the information may be exchanged continuously, periodically, or as-needed (such as when an object is detected or when there is pertinent information for another vehicle). Thus, in some embodiments, the information exchanged may be performed in a smart or intelligent manner to reduce the amount of information that is communicated between the first vehicle 110 and the second vehicle 112.

The exchanged information may include or may specify: raw measurement data (e.g., after analog-to-digital conversion, but before subsequent processing), one or more detected object (such as an object detected by the second vehicle 112), one or more object identifiers (such as a classification or a label for an object detected by the second vehicle 112), seed information for a detection technique (such as a priori information about a potential object in a mutual field of view of the first vehicle 110 and the second vehicle 112, such as a probability that the potential object is, in fact, a real object), and/or a priority or urgency of the exchanged information.

In some embodiments, the second vehicle 112 may perform a detection technique and may provide results of this detection technique to the first vehicle 110, which uses these results as a priori information when it subsequently performs the detection technique (such as a Bayesian detection technique). In some embodiments, the first vehicle 110 may concurrently perform the detection technique while the second vehicle 112 performs the detection technique, and then the first vehicle 110 and the second vehicle 112 may exchange the results of the detection techniques and, respectively, use the other vehicle's results as a priori information when subsequently performing the detection technique. In any of these ways, the first vehicle 110 and the second vehicle 112 may perform joint detection (either sequentially, iteratively or concurrently).

In general, the exchange of information between the first vehicle 110 and the second vehicle 112 may be a coordinated exchange. For example, there may be handshaking between the first vehicle 110 and the second vehicle 112, such as a request for information from the first vehicle 110 to the second vehicle 112, a response with the requested information from the second vehicle 112 to the first vehicle 110, and an optional acknowledgment from the first vehicle 110 to the second vehicle 112. Alternatively, the second vehicle 112 may provide a request to provide information to the first vehicle 110, and the second vehicle 112 may wait for a response authorizing the exchange of the information before providing the information to the first vehicle 110. However, when a given vehicle has high-priority information to communicate, this vehicle may push this information to the other vehicle without first receiving a request for the information or receiving authorization to provide the information. For example, the information may be pushed with high priority when a nearby pedestrian or bicycle is detected by the second vehicle 112, or when the second vehicle 112 determines that it is about to use its brakes or decelerate.

Note that a header in a packet or a frame that includes at least some of the exchanged information may include or specify: an identifier of the source vehicle, an identifier of the destination vehicle, a priority of the information, and/or a periodicity of the exchanged information (such as a time interval since there was a previous information exchange or until subsequent information will be exchanged).

In order to have sufficient capability to handle the processing of the exchanged information, a given vehicle may include one or more redundant digital detection channels. However, this requirement may constrain the number of vehicles that a given vehicle can pair with. Alternatively or additionally, in some embodiments, the detection channel in a given vehicle may be shared. For example, the detection channel may alternate process measurement data from the given vehicle and then from one or more other vehicles. This capability may be possible, e.g., in embodiments where the measurements performed by the vehicles are not concurrent, and may reduce the overhead associated with the circuit techniques and, thus, may increase the number of vehicles that the given vehicle can be paired with. In some embodiments, a given vehicle may limit the range of the measurements (such as by changing a time interval during which return signals are measured) or may limit the exchanged information in order to limit the amount of information that is communicated between the first vehicle 110 and the second vehicle 112.

In some embodiments, the first vehicle 110 may generate synthetic measurement data based at least in part on the exchanged information, and the synthetic measurement data may be used in the detection technique. For example, the synthetic measurement data may be generated using a pretrained neural network, such as a convolutional neural network, based at least in part on the exchanged information (and/or previously exchanged information). Notably, the second vehicle 112 may provide one or more tags or labels that indicate a detected object and its location and/or a classification or type of the detected object, and the first vehicle 110 may generate the synthetic measurement data for use in its detection channel based at least in part on the one or more tags or labels. Alternatively or additionally, the exchanged information may include compressed measurement data (e.g., measurement data that is compressed using a sparsity technique, principle component analysis, etc.) and the synthetic measurement data may be generated from the compressed measurement data. This may help significantly reduce the amount of information that is exchanged between the first vehicle 110 and the second vehicle 112. Moreover, in some embodiments, this capability may eliminate a need for a constraint on a number of vehicles that a given vehicle can pair with.

Note that the communication between the first vehicle 110 and the second vehicle 112 may use a wide variety of communication protocols.

Figure 4:
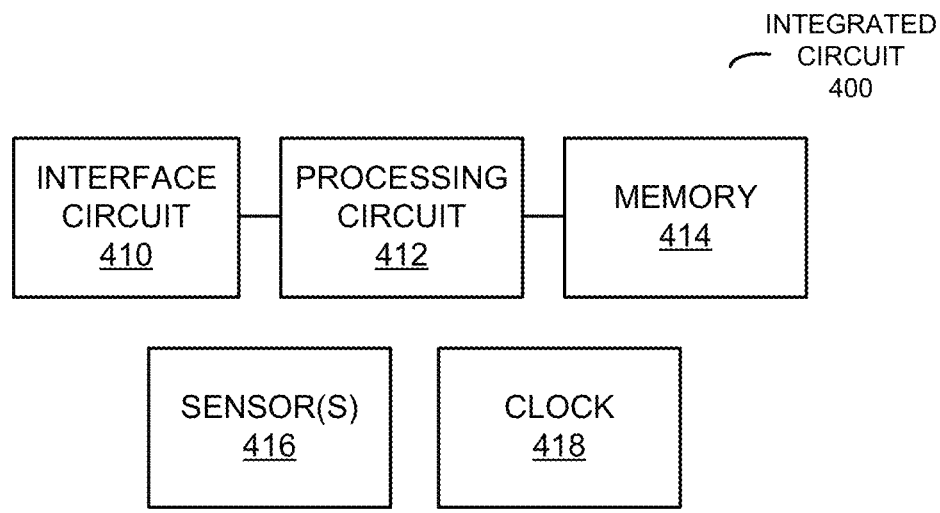
FIG. 4 is a block diagram illustrating an example of an integrated circuit according to some embodiments of the present disclosure.

FIG. 4 presents a block diagram illustrating an example of an integrated circuit 400 that, at least in, part implements the circuit techniques. This integrated circuit may include: an interface circuit 410 that communicates with a second integrated circuit in a second vehicle; a processing circuit 412 that performs at least some of the operations in the circuit techniques; and optional memory 414 that stores program instructions for execution by processing circuit 412 and/or information (such as measurement data). For example, the processing circuit 412 may include: one or more microprocessors, ASICs, microcontrollers, programmable-logic devices, one or more graphics process units (GPUs) and/or one or more digital signal processors (DSPs).

Moreover, integrated circuit 400 may perform measurements in the environment. For example, the measurements may include radar, lidar and/or another type of measurement, such as visual imaging using a camera. In some embodiments, integrated circuit 400 includes one or more optional sensors 416. Alternatively or additionally, integrated circuit 400 may communicate, via interface circuit 410, with one or more external sensors (e.g., in the first vehicle 110) that perform at least some of the measurements.

Furthermore, integrated circuit 400 may include a clock 418, which may be synchronized, via the pairing, with a clock in the second vehicle 112. Note that FIG. 4 does not illustrated all of the connections between the components.

Figure 5:
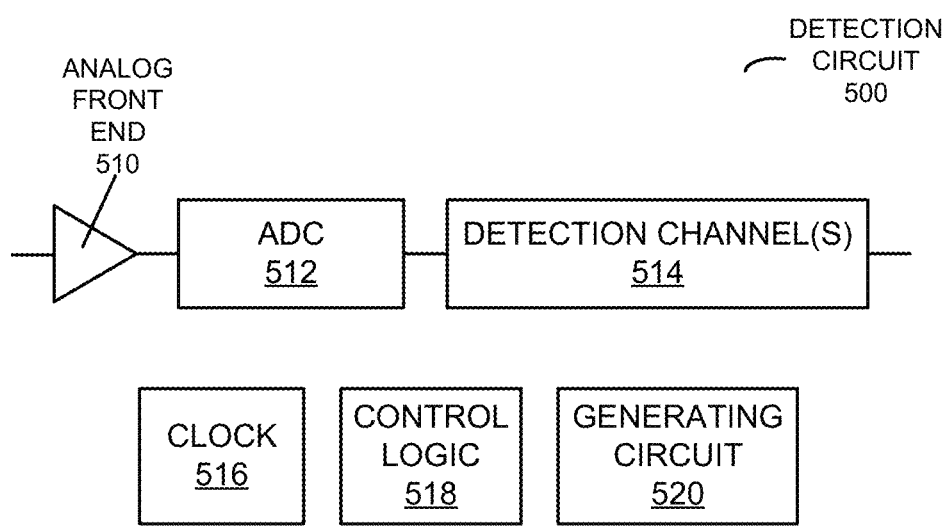
FIG. 5 is a block diagram illustrating an example of a detection circuit in an integrated circuit according to some embodiments of the present disclosure.

Additionally, as discussed previously, integrated circuit 400 may, at least in part, analyze measurements performed by integrated circuit 400 and/or another integrated circuit that integrated circuit 400 is paired with. This analysis may detect an object and/or may identify an object in the environment. FIG. 5 presents a block diagram illustrating an example of a detection circuit 500 in integrated circuit 400 (FIG. 4). Notably, detection circuit 500 may include: an analog front end 510 (such as a pre-amplifier); an analog-to-digital converter (ADC) 512; one or more detection channels 514 that implement one or more detection techniques; clock 516; and control logic 518 that configures and manages detection circuit 500. Note that there may be dedicated detection channels in the one or more detection channels 514 for measurements performed by a given integrated circuit. Alternatively or additionally, the one or more detection channels 514 may be shared when analyzing measurements performed by different integrated circuits. For example, the one or more detection channels 514 may analyze measurements associated with the first vehicle 110 in first time intervals and second measurements associated with the second vehicle 112 in second time intervals. In some embodiments, generating circuit 520 generate synthetic measurement data based at least in part on information received from the second vehicle 112, which is then used by the one or more detection channels 514. Note that FIG. 5 does not illustrated all of the connections between the components.

Figure 6:
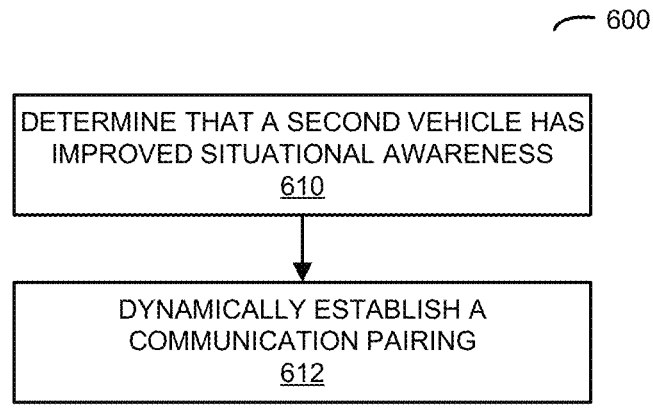
FIG. 6 is a flow diagram illustrating an example of a method for dynamically establishing a communication pairing according to some embodiments of the present disclosure.

We now describe embodiments of a method. FIG. 6 presents a flow diagram illustrating an example of a method 600 for dynamically establishing a communication pairing using an integrated circuit, such as integrated circuit 400 (FIG. 4). During operation, the integrated circuit may determine that a second vehicle has better situational awareness (operation 610) for a portion of a road or an environment proximate to the road than the first vehicle, where the second vehicle is proximate to the first vehicle. Then, the integrated circuit may dynamically establish, with the second integrated circuit in the second vehicle, the communication pairing (operation 612) with the second vehicle.

In some embodiments of the method 600, there may be additional or fewer operations. Moreover, the order of the operations may be changed, and/or two or more operations may be combined into a single operation.

The disclosed integrated circuit and the circuit techniques can be (or can be included in) any electronic device or system. For example, the electronic device may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, a camera or image sensor, an access point, a router, a switch, communication equipment, test equipment, a vehicle, a drone, a ship, an airplane, a car, a truck, a bus, a motorcycle, manufacturing equipment, farm equipment, construction equipment, or another type of electronic device.

Although specific components are used to describe the embodiments of the integrated circuit, in alternative embodiments different components and/or subsystems may be present in the integrated circuit. Thus, the embodiments of the integrated circuit may include fewer components, additional components, different components, two or more components may be combined into a single component, a single component may be separated into two or more components, one or more positions of one or more components may be changed, and/or there may be different types of components.

Moreover, the circuits and components in the embodiments of the integrated circuit may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

As noted previously, an integrated circuit may implement some or all of the functionality of the circuit techniques. This integrated circuit may include hardware and/or software mechanisms that are used for implementing functionality associated with the circuit techniques.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the circuit techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit for use in a first vehicle, comprising:
    an interface circuit configured to communicate with a second integrated circuit in a second vehicle; and
    a processing circuit, wherein the processing circuit is configured to:
        determine that the second vehicle has better situational awareness for a portion of a road or an environment proximate to the road than the first vehicle, wherein the second vehicle is proximate to the first vehicle;
        dynamically establish, with the second integrated circuit, a communication pairing with the second vehicle;
        wherein the interface circuit is further configured to dynamically create and discontinue the communication pairing, based at least in part on a predefined distance corresponding to a speed of the first vehicle, a speed of the second vehicle, or both;
        perform measurements in the environment;
        coordinate, via the communication pairing, the measurements with second measurements performed by the second integrated circuit;
        alternate, based at least in part on a duty cycle, transmissions of measurement signals by the integrated circuit and the second integrated circuit; and
        create, by jointly performing additional measurements, a larger baseline and a synthetic aperture.

2. The integrated circuit of claim 1 further configured to reduce interference during the measurements, by time domain multiple access, frequency domain multiple access, or orthogonal frequency domain multiple access, between the first vehicle and the second vehicle.

3. The integrated circuit of claim 1, wherein the measurements comprise radar measurements, lidar measurements, or both.

4. The integrated circuit of claim 1, wherein the processing circuit is configured to synchronize, via the communication pairing, a clock in the first vehicle with a second clock in the second vehicle.

5. The integrated circuit of claim 1 further configured to dynamically create and discontinue the communication pairing based at least in part on communication performance, wherein the communication performance is selected from the group of communication performance parameters consisting of one or more of: a received signal strength (RSSI), a data rate, a data rate for successful communication, an error rate, a mean-square error of equalized signals relative to an equalization target, an inter-symbol interference, multipath interference, a signal-to-noise ratio, a width of an eye pattern, a ratio of number of bytes successfully communicated during a time interval to an estimated maximum number of bytes that can be communicated in the time interval, and/or a ratio of an actual data rate to an estimated data rate.

6. The integrated circuit of claim 1 wherein the integrated circuit is further configured to dynamically create and discontinue the communication pairing, based at least in part on a distance between the first vehicle and the second vehicle being less than 50, 100, or 250 feet.

7. The integrated circuit of claim 1, wherein the integrated circuit is configured to concurrently perform measurements jointly with the second integrated circuit.

8. The integrated circuit of claim 1, wherein the integrated circuit is configured to jointly analyze measurements associated with the first vehicle, second measurements associated with the second vehicle or both.

9. The integrated circuit of claim 1, wherein the integrated circuit is configured to exchange, via the communication pairing, information with the second integrated circuit.

10. The integrated circuit of claim 9, wherein the exchanged information comprises or specifies: measurement data, one or more detected objects, one or more object identifiers, seed information for a detection technique, or a priority or urgency of the exchanged information; and
wherein the exchanged information is part of a Bayesian detection technique.

11. The integrated circuit of claim 10, wherein the seed information comprises a priori information.

12. The integrated circuit of claim 10, wherein the integrated circuit comprises one or more detection channels to analyze measurements associated with one or more detection channels of the one or more vehicles; and
wherein the one or more detection channels may be shared between a first vehicle and one or more vehicles.

13. The integrated circuit of claim 10, wherein the integrated circuit comprises a detection channel to analyze measurements associated with the first vehicle in first time intervals and second measurements associated with the second vehicle in second time intervals.

14. The integrated circuit of claim 9, wherein the integrated circuit is configured to:
generate synthetic measurement data based at least in part on the exchanged information; and
analyze measurement data associated with the first vehicle and the synthetic measurement data to detect an object in the environment, to identify the object in the environment or both.

15. The integrated circuit of claim 14, wherein the synthetic measurement data is generated using a pretrained neural network.

16. The integrated circuit of claim 1, wherein the integrated circuit is configured to perform measurements in the environment and communication, via the communication pairing, occurs in a band of frequencies associated with the measurements.

17. The integrated circuit of claim 1, wherein the integrated circuit is configured to perform measurements in the environment and communication, via the communication pairing, occurs outside of a band of frequencies associated with the measurements.

18. The integrated circuit of claim 1, wherein a number of possible communication pairings with the integrated circuit is based at least in part on a predefined distance corresponding to a speed of the first vehicle.

19. A vehicle, comprising:
an integrated circuit, wherein the integrated circuit comprises:
an interface circuit configured to communicate with a one or more integrated circuits in a one or more vehicles; and
a processing circuit, wherein the processing circuit is configured to:
determine that a second vehicle has better situational awareness for a portion of a road or an environment proximate to the road than the vehicle, wherein the second vehicle is proximate to the vehicle;
dynamically establish, via the second integrated circuit, a communication pairing with a second vehicle;
wherein the interface circuit is further configured to dynamically create and discontinue the communication pairing based at least in part on a predefined distance corresponding to a speed of the first vehicle, a speed of the second vehicle, or both;
perform measurements in the environment;
coordinate, via the pairing, the measurements with second measurements performed by the second integrated circuit;
alternate, based at least in part on a duty cycle, transmissions of measurement signals by the integrated circuit and the second integrated circuit; and
create, by jointly performing additional measurements, a larger baseline and a synthetic aperture.

20. A method for dynamically establishing a communication pairing, comprising:
by an integrated circuit for use in a first vehicle:
determining that a second vehicle has better situational awareness for a portion of a road or an environment proximate to the road than the first vehicle, wherein the second vehicle is proximate to the first vehicle;
dynamically establishing, via a second integrated circuit in the second vehicle, the communication pairing with the second vehicle; and
dynamically creating and discontinuing the communication pairing based at least in part on a predefined distance corresponding to a speed of the first vehicle, a speed of the second vehicle, or both;

performing measurements in the environment;
coordinating, via the communication pairing, the measurements with second measurements performed by the second integrated circuit; and
alternating, based at least in part on a duty cycle, transmissions of measurement signals by the integrated circuit and the second integrated circuit; and
creating, by jointly performing additional measurements, a larger baseline and a synthetic aperture.

* * * * *